(No Model.)
G. M. GRABERT & T. J. DENNIS.
STUMP PULLER.
No. 297,253. Patented Apr. 22, 1884.
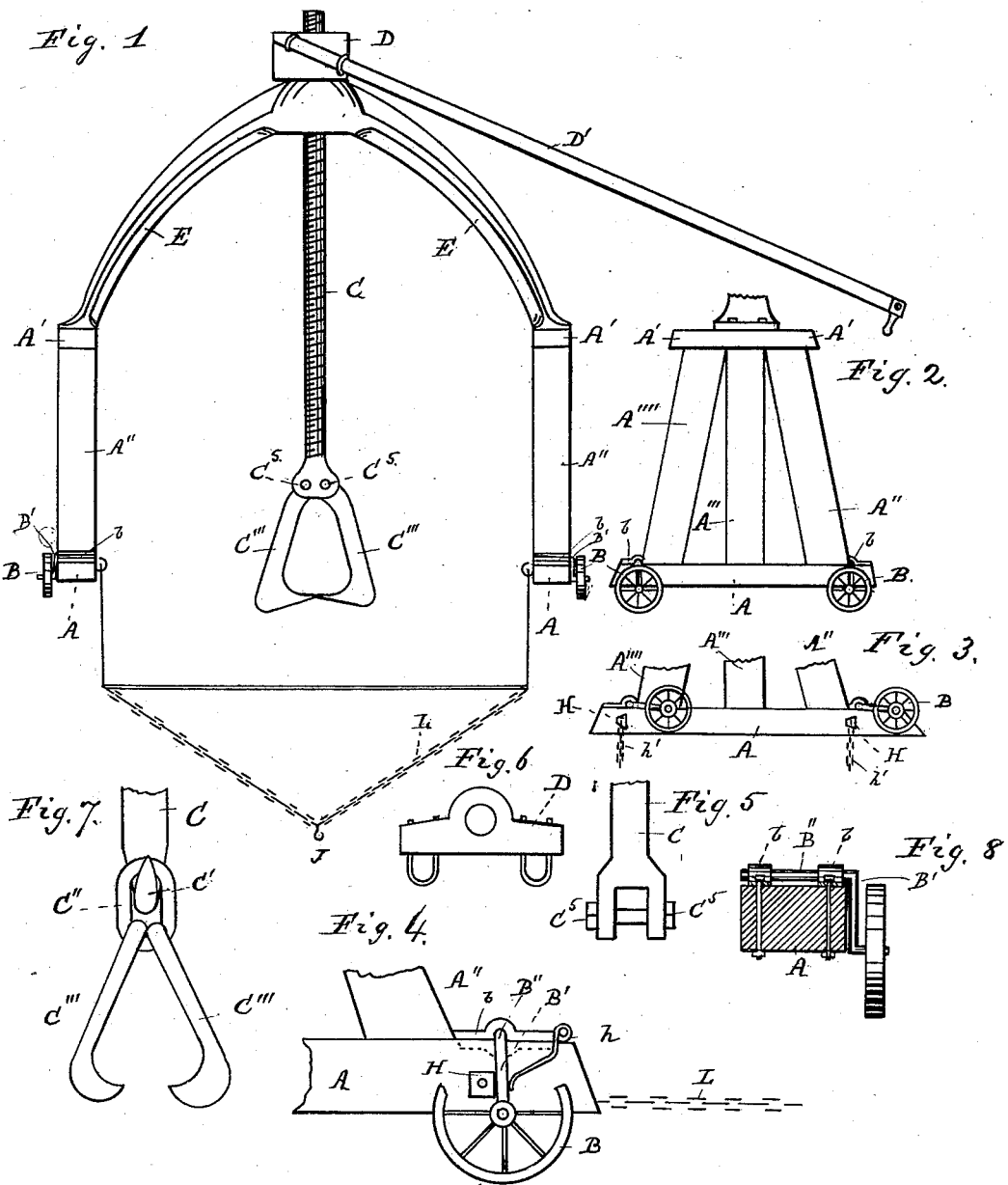
WITNESSES
Morton Toulmin
Edwin L Bradford
INVENTOR
George M. Grabert
Thomas J. Dennis
W. P. Leonard
Attorney

UNITED STATES PATENT OFFICE.

GEORGE M. GRABERT AND THOMAS J. DENNIS, OF MOUNT VERNON, IND.

STUMP-PULLER.

SPECIFICATION forming part of Letters Patent No. 297,253, dated April 22, 1884.

Application filed March 4, 1884. (No model.)

*To all whom it may concern:*

Be it known that we, GEORGE M. GRABERT and THOMAS J. DENNIS, citizens of the United States, residing at Mount Vernon, in the county of Posey and State of Indiana, have invented certain new and useful Improvements in Stump-Pullers, of which the following is a specification, reference being had therein to the accompanying drawings.

This invention relates to improvements in stump-pullers, and has for its objects to provide a machine of simple construction which may be drawn from one part of a field to another upon its wheels, and when placed over the stump may be lowered so that the whole strain of extracting the stump may come upon the bed and frame of the machine, and not upon its wheels or their axles, whereby these parts may be more lightly constructed than if made of sufficient weight and strength to bear the strain of extracting a stump. These objects are attained by the mechanism illustrated in the accompanying drawings, forming a part of this specification, in which—

Figure 1 is an elevation. Fig. 2 is a side elevation, and shows the wheels in the position they occupy when the machine is to be moved from one part of the field to another. Fig. 3 shows the base of the machine, part of the frame, and the wheels in the position they occupy when the base rests upon the ground. Fig. 4 is a detailed view of a part of the base A, with a portion of the wheel B broken away, and shows the relative position of stop H, axle B" B', and box $b$. Fig. 5 is a detached view of the lower part of the screw, and shows the opening for the reception of the upper parts of the hooks, and one of the bolts by which they are attached thereto. Fig. 6 is a detached view of the nut and the bands by which the lever is attached thereto. Fig. 7 is a detached view of the hooks when fastened to the screw by a link and hook. Fig. 8 is a detailed view of one of the wheels and part of the base of the machine in section.

The letter A indicates the base of the machine; A', the cap; A" A''' A'''', the uprights which support the cap, and also connect the cap and base of the machine to each other— in all ten pieces of timber firmly bolted or otherwise fastened to each other, five pieces for each side of the machine. The caps A' are connected to each other by an arched piece of iron, E, (the feet of which are securely bolted thereto,) having a central opening for the passage of a heavy bar of iron, C, having at least two-thirds of its entire length from the top downward cut with a screw-thread, and its lower end turned into a hook, C', to receive a link, C", provided with hooks C''', or bifurcated, as shown in Fig. 5, and provided with openings and bolts $C^5$, which pass through suitable openings in the upper part of each hook, from which they hang in a proper position to cause the points of the hooks to draw into the wood of a stump when the screw is drawn in an upward direction by means of the nut D and its lever D', which bear upon the upper part of the arch E, when the proper force is applied to the lever D'.

B are the wheels, which turn upon short axles of elbow form, which are journaled in suitable boxes, $b$, secured to base-timbers A on each side of the machine.

H are stops attached to the base A, against which the parts B' of the axles rest on one side, and each is provided with a chain, $h'$, to hold the axles in position while the machine is being drawn from one place to another; or, in place of a chain, pawls $h$ may be attached to the base-beams A, and be adapted to bear against the opposite side of the axle B', and thus maintain it in the desired position.

L is a chain to be attached to the front end of the machine, and is provided with a hook, J, by means of which the team may be secured thereto when the machine is moved from one place to another.

To use the machine it is placed so that the screw-rod C comes directly over the top of the stump. The wheels are then placed so that the base-pieces A rest upon the ground. The hooks C''' are then opened and placed so that their points will rest on the opposite sides thereof. The team may then be attached to the outer end of the lever D', and as the nut D is turned around, the screw-rod C will be drawn in an upward direction, the points of the hooks C''' will be drawn toward each other and be forced into the sides of the stump, and as the screw slowly revolves, the stump will be gradually drawn out of the ground.

Having described our invention, what we desire to secure by Letters Patent, and claim, is—

1. In a stump-puller, the base-beams A, caps A', and frames A" A''' A'''', secured to each other by arch-piece E, in combination with screw-rod C, having hooks C''' attached thereto, and nut D, having lever D', as described, and for the purposes set forth.

2. In a stump-puller, in combination with base-pieces A, caps A', frames A" A''' A'''', arch-piece E, and screw C, having hooks C''', nut D, and lever D', the adjustable wheels B, as described, and for the purposes set forth.

3. In a stump-puller, the combination of base-beams A, having stops H, pawls $h$, and boxes $b$, with elbow-axles B" B' and wheels B, substantially as described, and for the purposes set forth.

In testimony whereof we affix our signatures in presence of two witnesses.

GEO. M. GRABERT.
THOMAS J. DENNIS.

Witnesses:
A. J. CLARK,
CHAS. F. LEONARD.